United States Patent [19]

Hill et al.

[11] Patent Number: 5,150,439
[45] Date of Patent: Sep. 22, 1992

[54] SIMPLIFIED WDM FUSED FIBER COUPLER DESIGN

[75] Inventors: Kenneth O. Hill, Kanata; Francois Bilodeau, Nepean; Bernard Malo, Gatineau; Derwyn C. Johnson, Nepean, all of Canada

[73] Assignee: Her Majesty the Queen in right of Canada, as represented by the Minister of Communications, Canada

[21] Appl. No.: 704,274

[22] Filed: May 22, 1991

[30] Foreign Application Priority Data

Jul. 31, 1990 [CA] Canada ........................... 2022367

[51] Int. Cl.$^5$ ............................. G02B 6/00; G02B 6/36
[52] U.S. Cl. ................................................. 385/39
[58] Field of Search ............... 350/96.10, 96.15–96.16, 350/96.20–92.22

[56] References Cited

U.S. PATENT DOCUMENTS

| | | | |
|---|---|---|---|
| 4,723,824 | 2/1988 | Shaw et al. | 350/96.15 |
| 4,738,511 | 4/1988 | Fling | 350/96.15 |
| 4,755,037 | 7/1988 | Bjornlie et al. | 350/96.15 |
| 4,772,085 | 9/1988 | Moore et al. | 350/96.15 |
| 4,779,945 | 10/1988 | Hill et al. | 350/96.15 |
| 4,786,130 | 11/1988 | Georgiou et al. | 350/96.15 |

*Primary Examiner*—Akm E. Ullah
*Attorney, Agent, or Firm*—Pascal & Associates

[57] ABSTRACT

A two-channel optical fiber fused coupler comprising two optical fibers, each with a core and cladding, fused together at a narrow tapered waist. The first channel is at a wavelength of $\lambda_1$ and the second channel is at a wavelength of $\lambda_2$ where $\lambda_2$ is longer than $\lambda_1$. The coupler is fabricated to have a characteristic wavelength $\lambda_0$ such that for wavelengths $\lambda_2$ longer than $\lambda_0$ coupling occurs and for wavelenghts $\lambda_1$ shorter that $\lambda_0$ the light at $\lambda_1$ is core guided throughout the coupler and thus does not couple across.

6 Claims, 3 Drawing Sheets

SIMPLIFIED WDM FUSED FIBER COUPLER DESIGN

FIELD OF THE INVENTION

The invention relates to fused optical fiber couplers and, in particular, to two-wavelength-channel single mode fiber couplers.

BACKGROUND OF THE INVENTION

Wavelength division multiplexing has become an important tool for increasing the data transmission capacity of fiber optic communication systems and local area networks. A variety of different designs have been proposed for wavelength multiplexer/demultiplexers. These are of particular interest for single-mode fiber telemetry systems because of their higher bandwidth and lower loss.

U.S. Pat. No. 4,834,481 describes one type of single-mode fused coupler which acts as a wavelength multiplexer/demultiplexer at wavelengths of 1.32 μm and 1.55 μm. A tapered fused coupler can be fabricated by bringing two fibers together and then tapering and fusing with an appropriate heat source. This procedure is carried out with a light source coupled into one of the fibers while monitoring the light intensities from output ends of the fibers to determine the amount of coupling. The power transfer between the coupler output ends undergoes sinusoidal oscillations or beats as the tapering process continues and is said to have been pulled through one beat length when the coupled power has cycled through one complete sinusoidal oscillation back to zero. The coupling ratio will be equal to zero when the coupler is pulled through integer multiples of one beat length and will be equal to 100% at half-integer multiples of one beat length. In this particular coupler, the coupler is pulled through 3/2 beat lengths at the 1.32 μm monitoring wavelength in order to obtain 100% and 0% coupling ratios at the respective wavelengths 1.32 μm and 1.55 μm.

Drawbacks of the present methods of making two-channel fused couplers are their empirical nature. For a given type of monomode fiber, the fabrication conditions for the process are adjusted until the correct wavelength response is found. The fabrication of a fused coupler using monomode fibers from a different supplier requires the determination of a new set of fabrication conditions.

A further limitation of present designs for two-channel fused couplers is the isolation between the channels for these couplers. Successful operation of a wavelength division multiplex (WDM) link requires that the cross-talk between the channels is low. The isolation in a fused coupler can be large. However, due to lack of control in the manufacturing process, the 0% and 100% coupling points may not occur at exactly the desired wavelengths and the isolation between the channels can deteriorate considerably. Even if the coupler is made perfectly, crosstalk can result because of variations in the operating wavelengths of commercially available laser light sources. Furthermore, changes in environmental conditions can also shift the operating wavelength of a laser causing the isolation between the channels to deteriorate.

SUMMARY OF THE INVENTION

It is an object of the present invention to provide a two-wave-length-channel fiber coupler with very low cross-coupling between the channels.

It is a further object of the invention to provide an improved two-channel fiber coupler which is easier to fabricate than conventional couplers.

A two-channel optical fiber fused coupler, according to one embodiment of the present invention, consists of two optical fibers, each with a core and cladding, fused together at a narrow tapered waist; the two-channels consisting of a first channel at a wavelength of $\lambda_1$ and a second channel at a wavelength of $\lambda_2$, the coupler having a characteristic wavelength $\lambda_0$ where $\lambda_1 < \lambda_0 < \lambda_2$ such that coupling occurs for $\lambda_2$ and not for $\lambda_1$. The normalized frequency is defined as:

$$V = \frac{2\pi a}{\lambda} \sqrt{\eta_1^2 - \eta_2^2}$$

at wavelength $\lambda$ for all local fiber core radii throughout the coupling structure, where $a$ is the fiber core radius, $\eta_1$ is the refractive index of the core and $\eta_2$ is the refractive index at the cladding. The characteristic wavelength $\lambda_0$ is such that $V > 1$ but $\approx 1$ at the coupler waist where the radius is a minimum in the structure.

In a further preferred embodiment, the wavelength $\lambda_1$ is 1.3 μm and $\lambda_2$ is 1.55 μm.

In still another embodiment, the wavelength $\lambda_1$ is 0.8 μm and $\lambda_2$ is 1.3 μm.

BRIEF DESCRIPTION OF THE DRAWINGS

The present invention will now be described in more detail with reference to the accompanying drawings, wherein.

DESCRIPTION OF THE PREFERRED EMBODIMENT

A tapered fused optical fiber coupler is manufactured by bringing two fibers together and then fusing with an appropriate heat source while pulling to taper the coupler. A light source with wavelength $\lambda_2$ is applied to an end of one fiber A during pulling and the output ends of both fibers are monitored by detectors to determine the degree of coupling for that particular light source. A second light source with wavelength $\lambda_1$ is also applied to an end of the other fiber B while the output ends of both are also monitored for the frequency of the second light source. The simultaneous monitoring of light power having two different wavelengths at output ends of the fibers can be achieved by using dichroic mirrors to separate the wavelengths and direct each wavelength to a detector. Another method of monitoring light power having two different wavelengths is to use a 50% beam spitter to separate light from an output end of a fiber into two beams, the beams passing through interference filters to separate detectors.

Figure 1:
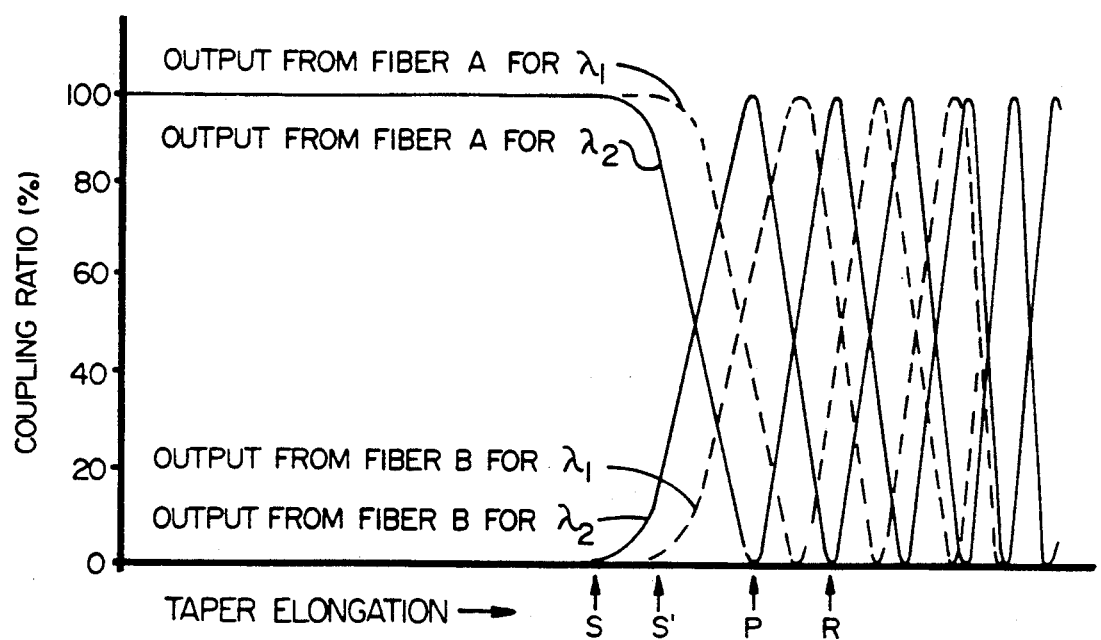
FIG. 1 illustrates how the coupling ratio between two fibers varies as a function of fiber extension.

FIG. 1 illustrates with two solid lines how the power output from the two fibers A and B oscillates back and forth as a function of fiber extension during the pulling process for light at one particular wavelength $\lambda_2$. There is no coupling between the fibers at the start of the pulling process, then at an extension corresponding to point S in FIG. 1 energy begins to couple into fiber B until with further extension at point P all of the energy in fiber A is coupled into fiber B with 0% of the energy being transmitted to the output of fiber A. On further elongation of the coupler, the amount of energy in fiber B decreases while the amount transmitted into fiber A increases until no energy is coupled in fiber B at point R. This process of alternating power transfer between fibers A and B continues in a sinusoidal fashion as the coupler is stretched further. The amount of energy transmitted to the output of fiber A during elongation of the coupler is the complement of that transmitted out of fiber B. That is energy transmitted out of fiber A is a maximum when the output from fiber B is a minimum and at a minimum when the output from fiber B is a maximum. The period of beat of the sinusoidal oscillations can be varied in a crude manner through such fabrication parameters as the degree of fiber fusion and rate at which taper occurs during coupler elongation.

The solid lines in FIG. 1 show the power transfer between two fibers for light at a single wavelength $\lambda_2$ as the coupler is elongated during a pulling process. However for a different shorter wavelength $\lambda_1$, as shown by dotted lines, the point S' at which coupling from one fiber to another starts to occur at a longer coupler elongation than for light at the wavelength $\lambda_2$. In conventional tapered two-channel fused couples, the stretching of the fused fibers is continued for a number of beat lengths until the required coupling for both $\lambda_1$ and $\lambda_2$ is achieved as determined by detectors at output ends of the fibers.

Figure 1A:
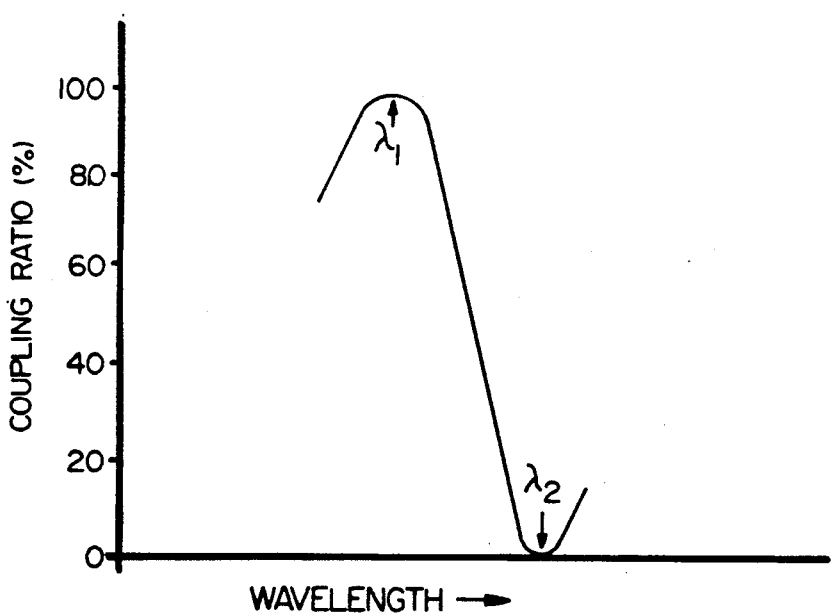
FIG. 1A illustrates how the coupling ratio between two fibers varies as a function of wavelength.
Figure 2:
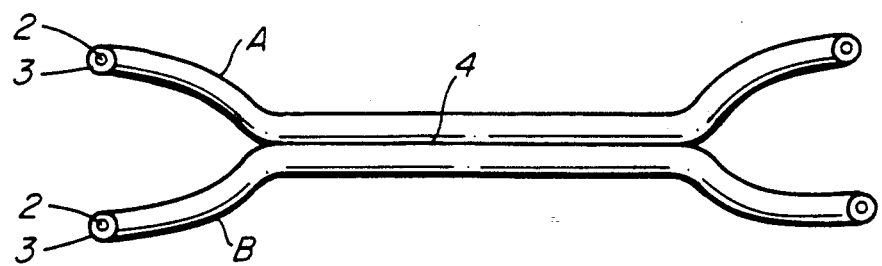
FIG. 2 illustrates two fibers coupled together before fiber extension.

The desired spectral response for a conventional two-channel fused coupler is shown in FIG. 1A, i.e. with light at both wavelengths $\lambda_1$ and $\lambda_2$ launched into the same input of fiber A where the output of fiber A is $\lambda_2$ and the output of fiber B is $\lambda_1$. Since during fabrication light at $\lambda_2$ is launched into fiber A and light at wavelength $\lambda_1$ is launched into fiber B, the desired spectral response is achieved during fabrication when, at the same elongation point, all the light at both wavelengths $\lambda_1$ and $\lambda_2$ comes out of fiber A. This may not exactly occur and the fabrication conditions (degree of fusion and rate of tapering) may need to be adjusted until a coincidence is obtained at the same elongation. The sinusoidal oscillations are more rapid as the coupler is elongated (see FIG. 1) and the chance of obtaining coincidence increases. In practice, elongations of 2 to 3 beat lengths are generally required.

Nevertheless, due to lack of control in the manufacturing process, the 0% and 100% coupling points in FIG. 1A may not be obtained exactly at the specified wavelengths $\lambda_2$ and $\lambda_1$ respectively, and the isolation between the two channels can be considerably reduced. Even if the coupler is perfectly made, crosstalk can result because of variations in operating wavelengths of manufactured laser light sources. In addition, changes in environment conditions for those lasers can also shift their operating wavelengths which changes the amount of crosstalk between the channels.

The design of a new two-wavelength-channel fused coupler according to the present invention is now described.

Figure 4:
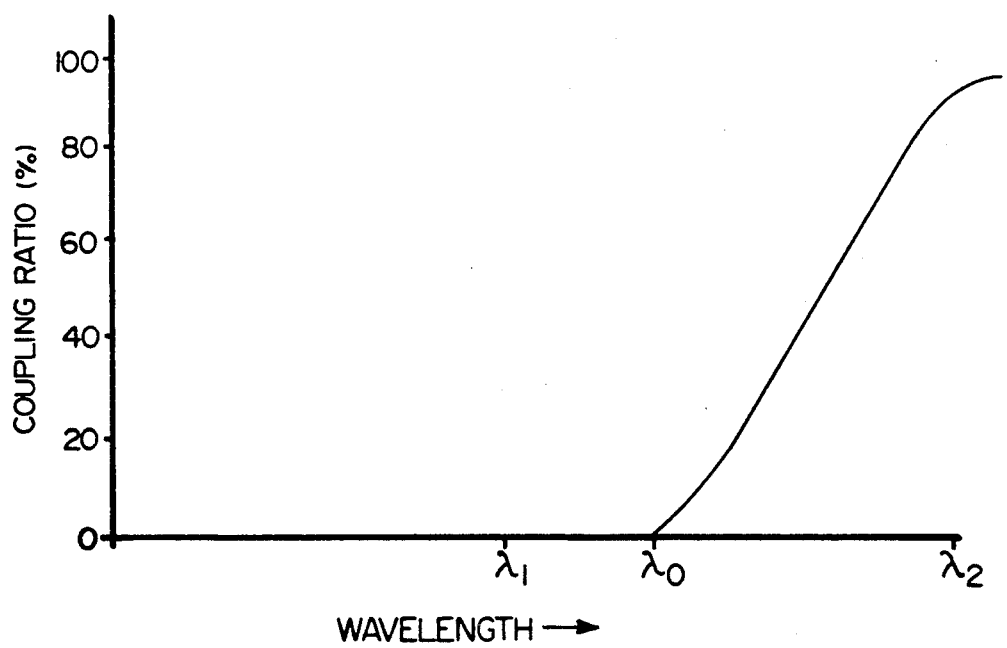
FIG. 4 illustrates the coupling ratio with respect to wavelength of a coupler according to the present invention.

In any fused coupler, a requirement for coupling to occur is that the cores 2 of the fibers forming the coupler be tapered sufficiently so that the normalized frequency V for the local $HE_{11}$ mode becomes less than unity where $$V = \frac{2\pi a}{\lambda} \sqrt{\eta_1^2 - \eta_2^2}$$

where $\lambda$ is the wavelength of the light, $a$ is the fiber core radius, $\eta_1$ is the refractive index of the fiber core and $\eta_2$ is the refractive index of the fiber cladding. During taper, the fiber core radius $a$ decreases and the local normalized frequency becomes less than unity. The effect of V decreasing below unity can be observed directly through the onset of coupling, i.e. point S in FIG. 1. If a fused coupler is fabricated using $\lambda_0$ as the monitoring wavelength and coupler elongation stopped just at the onset of coupling, the coupler has the property that for wavelengths shorter than $\lambda_0$ no coupling occurs whereas for wavelengths longer than $\lambda_0$ coupling occurs. The spectral response is shown in FIG. 4. Thus, a fused coupler has a characteristic wavelength $\lambda_0$ for which the normalized frequency V is approximately $\lambda$ unity at the waist of the coupler and larger elsewhere. In conventional fused two-channel WDM coupler, the wavelengths of the two channels are always longer than $\lambda_0$ so that coupling occurs for both wavelength channels.

A two-channel WDM fused coupler according to the present invention is fabricated during pulling so that the taper of the waist portion 5 (FIG. 3) is such that the normalized frequency V for the local $HE_{11}$ mode is equal to or less than unity for only one of the channels, the one with the longer wavelength $\lambda_2$. Light energy at the other channel at a wavelength $\lambda_1$, which is shorter than $\lambda_0$, is core guided throughout the coupling structure since for that wavelength the normalized frequency V for the local $HE_{11}$ mode is greater than unity and no coupling occurs. The cross coupling of the short wavelength channel $\lambda_1$ into the long wavelength channel $\lambda_2$ will be very low since the short wavelength channel is core guided throughout the coupler. That cross coupling will also be relatively insensitive to changes in wavelength of the short wavelength channels such as caused by changes in the environmental conditions.

The cross coupling of the long wavelength channel into the short wavelength channel can also be kept low since the 100% coupling of the long wavelength occurs in the first power transfer cycle, unlike conventional couplers, which has a broad flat wavelength response. This results in the isolation being insensitive to small variations in the wavelength of the light in the long wavelength channel. Furthermore, the presence of polarization modes in the coupling structure is minimal in the first power transfer cycle. The presence of those modes can decrease the isolation between the channels.

A fused coupler with a design according to the present invention has a unique response since for wavelengths shorter than $\lambda_0$ there is no coupling and for wavelengths longer than $\lambda_0$ there is coupling. A consideration in the design of such fused couplers is that the coupling structure has a restriction on its waist diameter.

Figure 5:
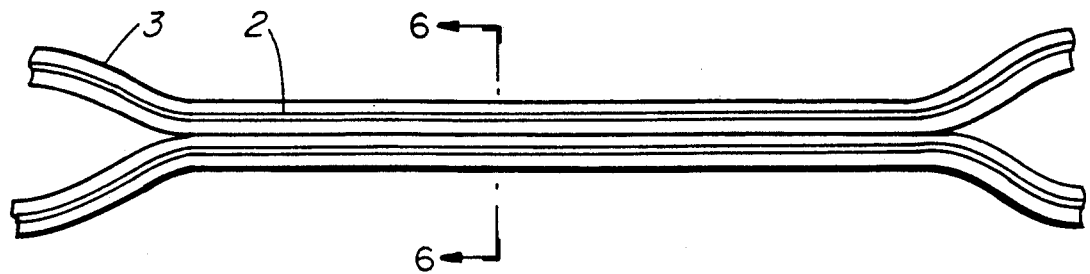
FIG. 5 shows a cross-section along the length of an ideal coupler according to the present invention.
Figure 6:
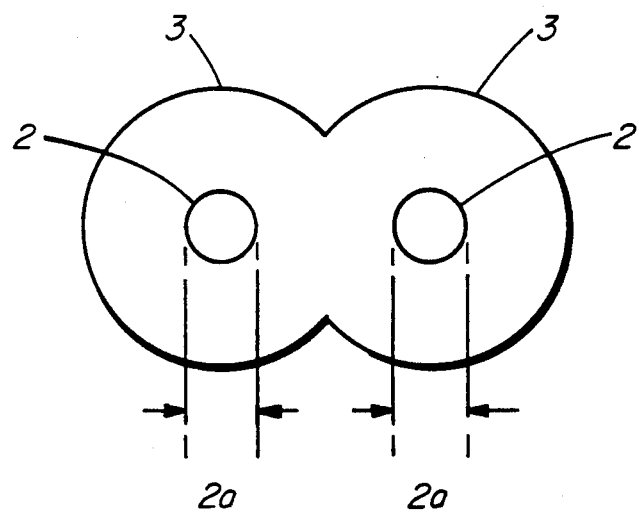
FIG. 6 is an enlarged cross-sectional view taken along lines 8—8 of FIG. 5.

The requirement that the local normalized frequency V be greater than unity for all wavelengths shorter than $\lambda_0$ places a restriction on the minimum radius $a_{min}$ that the fiber cores can have in the coupling structure. That is $$a_{min} \geq \frac{\lambda_0}{2\pi \sqrt{\eta_1^2 - \eta_2^2}}$$

throughout the coupling structure. This requirement reduces the coupling coefficient for light at the longer wavelength $\lambda_2$. In order to obtain 100% coupling at $\lambda_2$, it is necessary to fabricate a coupler with a long interaction length. The ideal longitudinal radial profile for the coupling structure is tapers at ends with a central waist section of constant diameter as shown in FIG. 5 so that the diameter of the fiber core fused section is greater than $2a_{min}$. Fabrication of this ideal longitudinal radial profile has previously been difficult. However, a method of fabricating very long couplers that approach the ideal taper profile is described in U.S. Pat. No. 4,895,423 using a flame-brush technique.

Figure 3:
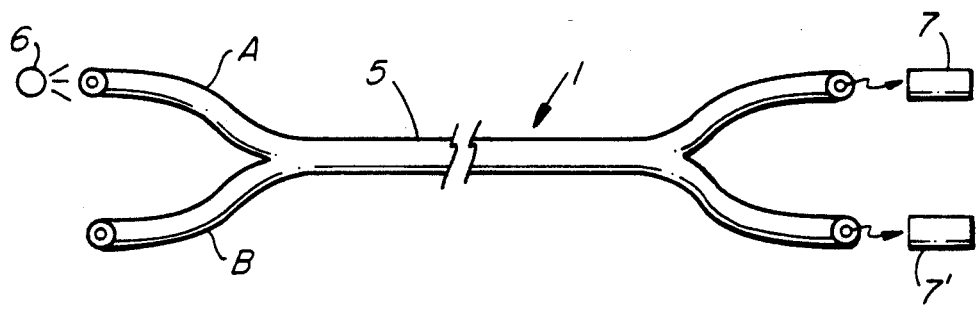
FIG. 3 illustrates two fibers coupled together according to the present invention and a method of monitoring the coupling during pulling of the coupled fibers.

During manufacture of the coupler, as illustrated in FIG. 3 light of the longer wavelength from a source 6 is coupled into one end of fiber A and detectors 7 and 7' are coupled to the output ends of fibers A and B. The detectors provide an indication when energy from source 6 is 100% coupled. The coupler, 1, according to the present invention, is therefore easier to fabricate than conventional two-channel fused couplers since only one predetermined wavelength (the longer wavelength) needs to be monitored during the fabrication process. In order to ensure that coupling does not occur at the shorter wavelength $\lambda_1$, the tapering is controlled so that in the coupling structure, the fiber core radii are greater than $$\frac{\lambda_0}{2\pi \sqrt{\eta_1^2 - \eta_2^2}}$$

where $\lambda_0$ is chosen to be longer than $\lambda_1$ but shorter than $\lambda_2$.

The predetermined wavelengths for one coupler, according to one embodiment of the present invention, is 1.32 μm and 1.55 μm since these are common frequencies for many single mode telemetry systems because of the low loss and low dispersion exhibited by commercial fibers at these wavelengths.

In another embodiment of the invention, the predetermined wavelengths are 0.8 μm and 1.3 μm which may have an application in fiber systems for the distribution of services to a home using a single monomode fiber link with bidirectional WDM transmission. The downstream traffic to the home would be carried on a wideband 1.3 μm channel while the upstream traffic is low bandwidth and would operate at 0.8 μm. The choice of 0.8 μm is convenient in order to take advantage of low cost lasers that are presently used in compact disc players.

An important application for these WDM couplers is the pump coupler in fiber amplifiers and lasers. A specific example is the Erbium$^{3+}$-doped fiber amplifier which operates in the 1536 nm region and can be pumped with 980 nm light. Both the pump light and the signal light is coupled into the fiber. In this case the design for the coupler is 100% coupling at the signal wavelength 1550 nm and 0% coupling at the pump wavelength, i.e. a pumping wavelength of less than about 1000 nm would not couple at all.

An advantage of use of the coupler design disclosed herein is that only the coupling coefficient at the signal wavelength need to be accurately controlled in the fabrication process. The coupling coefficient in the short wavelength region is flat at 0% and is insensitive to the pump wavelength. Furthermore pumps having different wavelengths can be used. Simplification achieved by the present invention is that the pump wavelength need not be exact.

Various modifications may be made to the preferred embodiments without departing from the spirit and scope of the invention as defined in the appended claims.

We claim:

1. A two-channel single mode optical fiber fused coupler comprising two optical fibers, each with a core and cladding, fused together at a narrow tapered waist, wherein a first channel is at a wavelength of $\lambda_1$ and a second channel is at a wavelength of $\lambda_2$, the coupler having a characteristic wavelength $\lambda_0$ where $\lambda_1 < \lambda_0 < \lambda_2$ and the normalized frequency $$V = \frac{2\pi a}{\lambda_0} \sqrt{\eta_1^2 - \eta_2^2} > 1 \text{ but } \approx 1$$

for all local fiber core radii throughout the coupling structure where $a$ is the fiber-core radius, $\eta_1$ is the refractive index of the core and $\eta_2$ is the refractive index of the cladding.

2. A two-channel optical fiber fused coupler as determined in claim 1, wherein $\lambda_1$ is approximately 1.3 μm and $\lambda_2$ is approximately 1.55 μm.

3. A two-channel optical fiber fused coupler as defined in claim 1, wherein $\lambda_1$ is approximately 0.8 μm and $\lambda_2$ is approximately 1.3 μm.

4. A two-channel optical fiber fused coupler as defined in claim 1 forming a pump coupler in a fiber amplifier.

5. A two-channel optical fiber fused coupler as defined in claim 1 forming a pump coupler in a laser.

6. A two-channel optical fiber fused coupler as defined in claim 4 in which the fiber amplifier is Erbium doped, operates in the 1636 nm region and is pumped with 980 nm optical energy.

* * * * *

UNITED STATES PATENT AND TRADEMARK OFFICE
CERTIFICATE OF CORRECTION

PATENT NO. : 5,150,439
DATED : September 22, 1992
INVENTOR(S) : Kenneth O. Hill et al It is certified that error appears in the above-identified patent and that said Letters Patent is hereby corrected as shown below:

Column 6, line 59, delete "1636 nm" and insert therefor

--1536 nm--.

Signed and Sealed this

Twenty-first Day of January, 1997

Attest:

BRUCE LEHMAN

Attesting Officer

Commissioner of Patents and Trademarks